United States Patent Office 2,839,507
Patented June 17, 1958

2,839,507

PRODUCTION OF COPOLYMER OF A 2-ARYL-ALKENE-1 AND AN ALPHA, BETA-OLEFINIC ALDEHYDE, AND DERIVATIVES THEREOF

Edward C. Shokal, Walnut Creek, and Paul A. Devlin, Berkeley, Calif., assignors to Shell Development Company, Emeryville, Calif., a corporation of Delaware No Drawing. Application September 21, 1953
Serial No. 381,462

6 Claims. (Cl. 260—73)

This invention relates to production of a very useful and novel copolymer and derivatives thereof. More particularly, the invention is concerned with a copolymer of a 2-arylalkene-1 and an alpha, beta-olefinic aldehyde, and to related derivatives of the copolymer.

According to the present invention, a mixture of a 2-arylalkene-1 containing at least three carbon atoms in the alkene group and an alpha, beta-olefinic aldehyde is heated and copolymerized, with or without the presence of a peroxy polymerization catalyst, to form a copolymer containing a plurality of aldehyde groups. The resulting copolymer is a solid which is thermoplastic and fusible, and is also soluble in a variety of organic solvents such as benzene, dioxane and pyridine. In containing the plurality of aldehyde groups, the copolymer is reactive with various chemicals to give a variety of useful derivatives. The present invention thus includes, for example, the further reaction of the aldehydic copolymer with hydrogen to give a product containing a plurality of alcoholic hydroxyl groups, with formaldehyde to give methylol-containing derivatives and resinous products, with hydroxylamine to give polymeric oximes, with oxidation agents to give polymeric polycarboxylic acids, with ammonia or amines to give nitrogen-containing derivatives, with mercaptans to give polymeric mercaptals, with phenols to give resinous products, and with urea or melamine to give nitrogen-containing resins.

The aldehydic copolymer of the invention is preferably prepared from 2-phenylpropene and acrolein, but it can be prepared from any 2-arylalkene-1 containing at least three carbon atoms in the alkene group, and an alpha, beta-olefinic aldehyde. Among the suitable hydrocarbons are such representative compounds at 2-phenylbutene-1, 2-phenylpentene-1, 2-phenyl-3-methylbutene-1, 2 - phenyloctene - 1, 2 - phenyloctadecene-1, 2-(4-methylphenyl)propene-1, 2-(2-isopropylphenyl)butene-1, 2-(4-phenylphenyl) heptene - 1, 2 - (2,4 - dimethylphenyl)propene-1, 2-(2,4,6-trimethylphenyl)-propene-1, and 2-naphtheylpropene-1. Among the alpha, beta-olefinic aldehydes, the alpha-methylene alkanals are particularly suited for preparation of the copolymer. Typical aldehydes include 2-methylpropenal, 2-ethylpropenal, 2-isopropylpropenal, 2-isobutylpropenal, 2-neopentylpropenal, 2-octylpropenal, 2-phenylpropenal, and the like.

The copolymerization of the unsaturated aldehyde with the 2-arylalkene-1 is effected by heating a liquid mixture of the two compounds at about 50° C. to 200° C., preferably at about 80° C. to 150° C. Especially when copolymerizing the preferred reactants, acrolein and 2-phenylpropene, it is convenient to reflux the mixture at normal pressure in order to regulate the temperature and induce the polymerization. If desired, however, the copolymerization may be conducted at any temperature within the indicated range, but when the temperature is above the normal boiling point of the mixture, sufficient pressure is applied to keep the reaction mixture in the liquid phase.

It has been found that the copolymerization occurs in either the presence or absence of a peroxy polymerization catalyst. When a catalyst is used, any of the various peroxy polymerization catalysts may be employed such as, for example, benzoyl peroxide, acetyl peroxide, lauroyl peroxide, di-tertiary-butyl peroxide, tertiary-butyl hydroperoxide, etc. It is preferred that the catalyst be soluble in the monomer mixture. The amount of peroxide used may be as customary for such catalysts, particularly from about 0.2 to 10% by weight and preferably about 0.5 to 3% by weight of the monomeric mixture.

The unsaturated aldehyde, especially when it is an alphamethylene alkanal, is very reactive. Consequently, the liquid mixture of the two reactants subjected to copolymerization normally starts with the 2-arylalkene-1 and unsaturated aldehyde present in a mol ratio of the hydrocarbon to aldehyde of about 50:50 to 98:2. The initial mixture may contain the total amount of the two monomers. If desired, however, all or part of the unsaturated aldehyde may be added to the heated mixture during the course of the copolymerization.

The mixture of the two polymerizable compounds consisting essentially of the 2-arylalkene-1 and the alpha, beta-olefinic aldehyde that is subjected to the copolymerizing conditions in the process does not normally form copolymer which has units of the aldehyde present in the polymer molecules in the same proportion as in the monomer mixture. The copolymer generally contains a larger proportion of chemically combined aldehyde than the proportion in the monomer mixture. Thus, in copolymerizing a monomer mixture containing a mol ratio of the hydrocarbon to the aldehyde of about 50:50 to 98:2, the resulting copolymer contains about 5 to 60 mol percent of units in the molecules thereof. In view of this fact, the reaction mixture upon completion of the copolymerization contains unreacted 2-arylalkene-1 along with the formed copolymer. In the absence of monomeric aldehyde, the 2-arylalkene-1 is very resistant against homopolymerization even in the presence of peroxide polymerization catalysts. Upon completion of the copolymerization, the polymeric product which is present as a solution in the unpolymerized monomeric hydrocarbon is recovered in any suitable manner. Usually the mixture is subjected to distillation whereby the volatile hydrocarbon is separated as distillate and the formed copolymer remains as residue. For this purpose, the distillation may be conducted under reduced pressure to aid in substantially complete removal of the hydrocarbon from the copolymer. Other methods may be used, if desired, such as addition of a non-solvent (alcohol or the like) to the solution to precipitate the copolymer, followed by filtration to separate the precipitate.

The behavior of the 2-arylpropene-1 containing at least three carbon atoms in the alkene group in copolymerizing with the unsaturated aldehyde is unique. As was previously noted, the alpha, beta-olefinic mono-aldehyde is very reactive with the result in general that attempts to polymerize it alone or in combination with other olefinic materials are unsuccessful or result in products of no value. This is partly because the aldehyde is quite subject to condensation reactions which give cross-linked insoluble products with chemical change of the aldehyde groups. Furthermore, attempts to copolymerize the aldehyde with active olefinic compounds such as phenylethene results in reactions which proceed with explosive violence. In contrast to such behavior, we have found that the unsaturated aldehyde can be smoothly copolymerized with a 2-arylalkene-1 containing the alkene group of at least three carbon atoms to give a highly useful copolymer containing a plurality of unchanged aldehyde groups in the molecules thereof.

The copolymer of the invention is a very useful material. At normal temperature of about 20° C., it is a fusible solid and is soluble in various organic solvents including acetone, benzene, toluene, dioxane, chloroform, and pyridine. The copolymer may be used in the manufacture of molded articles, coatings, soil conditioners, etc. It may be used in combination with other film-forming and molding resins such as nitrocellulose, polyvinyl chloride-acetate and varnish oils. Probably the outstanding utility of the copolymer is as a raw material for preparation of other useful derivatives by reaction of the copolymer with various chemicals. Thus, for example, the resinous polyhydric alcohol obtained by hydrogenating the copolymer and reducing the aldehyde groups to alcoholic hydroxyl groups is a very versatile and useful material.

The resinous polyhydric alcohol is prepared by subjecting the aldehyde copolymer to catalytic hydrogenation in a solvent. Dioxane is a preferred solvent, but others such as benzene or toluene may be used if desired. The amount of solvent may be varied considerably, it only being necessary that the solution of copolymer be fluid. Ordinarily, a solution containing about 10% to 75% of copolymer is used. Also present is any of the usual hydrogenation catalysts such as the active metals including nickel, cobalt, platinum, copper, silver, etc., or mixtures of two or more thereof. Nickel catalysts give especially desirable results, and well known Raney nickel is a preferred catalyst. The amount of catalyst is usually from about 0.5 to 10% based upon the weight of copolymer.

In effecting the hydrogenation, the usual procedure is to place the mixture of aldehyde copolymer, solvent and catalyst in a pressure vessel and sweep out atmospheric gases with hydrogen. The temperature of the contents of the vessel is brought up to about 80 to 250° C., and hydrogen is forced in at superatmospheric pressure of about 200 to 5000 or more pounds per square inch. The contents are agitated and in this manner the aldehyde groups of the copolymer are reduced. It is preferred that the hydrogenation treatment be continued until a majority of the aldehyde groups in the polymer molecules thereof are reduced to alcoholic hydroxyl groups. The reduction may be complete or substantially so.

The product is a hydrogenated copolymer of the 2-arylalkene-1 and the unsaturated aldehyde. It is a very useful resinous polyhydric alcohol. By mixing it with heat-convertible urea-formaldehyde or melamine-formaldehyde resins and subjecting the mixture to baking as a film, surface coating films for protective purposes are obtained. By esterifying the hydrogenated product with polycarboxylic acids, new alkyd resins are produced. Synthetic drying oils are obtained by esterifying the hydrogenated product with unsaturated fatty acids such as are obtainable from soybean oil, dehydrated castor oil, linseed oil and the like.

Other valuable products are obtained by chemical treatment of the aldehyde copolymer. Thus by subjecting the copolymer to oxidation, there is obtained a useful resinous polycarboxylic acid which may be esterified with alcohols to give esters, or neutralized with ammonia and/or soda to give salts useful as soil conditioners. Other useful derivatives may be prepared from the aldehyde copolymer as will be evident from the examples given below.

The following examples are given for the purpose of illustrating the invention, but they are not to be construed as limiting the scope thereof to the described details. The parts and percentages are by weight.

*Example I*

A mixture of 94 parts of 2-phenylpropene, 4 parts of acrolein and 2 parts of di-tertiary-butyl peroxide was heated at reflux temperature of about 122 to 126° C. for 27.5 hours and it was found that the refractive index ($n$ 20/D) of the mixture increased from 1.5311 to 1.5435. The unreacted materials were then removed by distillation under reduced pressure to give 17 parts of light yellow brittle resin having a carbonyl value of 0.20 equivalent per 100 grams, a hydroxyl value of 0.02 equivalent per 100 grams, a molecular weight of 729 and a Durrans' Mercury Method softening point of 76° C.

A polyhydric alcohol was prepared from the copolymer by catalytic hydrogenation. There was dissolved 7.5 parts of the copolymer in 8.5 parts of benzene and 0.6 part of Raney nickel was added as catalyst. The mixture was agitated and heated at about 140–150° C. in the presence of hydrogen under a pressure of about 500–1700 pounds per square inch (p. s. i.) for 10 hours. After removal of the catalyst by filtration of the solvent by distillation, there was obtained a solid resin with a hydroxyl value of 0.23 equivalent per 100 grams.

*Example II*

A solution of 69 parts of 2-phenylpropene, 30 parts of acrolein and 1 part of di-tertiary-butyl peroxide was heated at reflux temperature for 33 hours during which time the refractive index ($n$ 20/D) rose from 1.5095 to 1.5380. Reduced pressure distillation for removal of unreacted materials gave 50 parts of a brittle yellow resin having a carbonyl value of 0.363 equivalent per 100 grams, a molecular weight of 1500 and a softening point of 141° C. (Durrans). The resin was soluble in benzene.

*Example III*

To a refluxing solution of 850 parts of 2-phenylpropene, 10 parts of acrolein and 20 parts of di-tertiary-butyl peroxide, 120 additional parts of acrolein was added during a period of 6 hours. The solution was refluxed another 9 hours and then the unreacted materials were removed by distillation at reduced pressure whereby a 44% yield of resin was obtained. The resulting resin had a carbonyl value of 0.359 equivalent per 100 grams, a hydroxyl value of 0.068 equivalent per 100 grams, and a Durrans' Mercury Method softening point of 107° C.

A 40% solution of the copolymer in dioxane containing about 2% of Raney nickel was subjected to hydrogenation at 150° C. for 41 hours at about 500–1800 p. s. i. After removal of the catalyst and solvent, there was obtained an almost colorless solid resin having a hydroxyl value of 0.362 equivalent per 100 grams, a carbonyl value of 0.003 equivalent per 100 grams, a molecular weight of 1163 and a softening point of 113° C. (Durrans).

*Example IV*

An air-drying fatty acid ester of the hydrogenated copolymer obtained as described in Example III was prepared. The copolymer in amount of 92 parts along with 100.7 parts (100% of theoretical amount) of soybean fatty acid and about 87 parts of xylene was placed in a reaction vessel fitted with a stirrer and a distillation head arranged to separate and remove water distilling out as the azeotrope with xylene. The reaction mixture was stirred and heated to 250° C., and maintained at this temperature for about 5 hours while effecting esterification and removing the water of reaction. Upon completion of the reaction, there was added 50 parts of petroleum-derived paint and varnish thinner having a boiling range (ASTM) of about 310 to 390° F. and containing about 20% aromatic hydrocarbons. The solution of soybean fatty acid ester of the hydrogenated copolymer contained 59% solids, had a Gardner-Holdt viscosity of E–F, and the ester had an acid number of 13.8 (solid basis). Cobalt naphthenate as drier in amount of 0.04% cobalt based upon the ester was added to the solution. Films were prepared by spreading the solution on glass panels with a 5 mil doctor blade. Drying properties were determined according to the procedure described by Henry A. Gardner in "Physical and Chemical Examination of Paints, Varnishes, Lacquers and Colors" (1939), pages 106–107. It was found that drying ester set to touch in 1 hour, was cotton-free in 2¾ hours and dried hard in 4½ hours. Similar drying tests on linseed oil containing 0.05% cobalt and 0.50% lead as naphthenate driers gives 1½ hours to set to touch, 10 days to dry hard, and does not become cotton-free in 50 days. The dried films were tough and adherent, and after drying for one week, had a Sward hardness of 13. The linseed oil had a Sward harness of 0 after one week.

*Example V*

The hydrogenated copolymer of Example III was also found to give excellent baked films when used in combination with melamine and with urea resins. Two commercial resins were used in which one was a convertible melamine-formaldehyde resin known as Melamac 248-8, and the other was a butylated urea-formaldehyde resin known as Beetle 227-8. Four solutions were prepared using xylene as a diluting solvent. The solutions contained 50% of solids (hydrogenated copolymer plus melamine resin or urea resin) with the solids consisting of a weight ratio of hydrogenated copolymer to melamine resin or urea resin of 80/20 and 60/20. The solutions were spread on glass plates with a 4 mil doctor blade and the films were allowed to dry by evaporation after which the coated plates were baked in an air oven for 30 minutes at 190° C. to effect cure. The resulting films were hard, tough and transparent. The cured films were all resistant and unchanged after being contacted with each of boiling water, acetone, toluene, glacial acetic acid and 20% aqueous sodium hydroxide. They were resistant to mar when the edge of a human fingernail was heavily drawn across them, and they had a pencil hardness of 2H to 4H.

*Example VI*

A solution of 93 parts of 2-phenylpropene, 5 parts of acrolein and 2 parts of di-tertiary-butyl peroxide was heated at 110° C. for 19 hours under a nitrogen atmosphere. The copolymerization was carried out in a stainless steel vessel under an autogenous pressure of about 20 p. s. i. The unreacted materials were removed by reduced pressure distillation and about 18 parts of copolymer was recovered.

About a 45% solution of the copolymer in dioxane containing about 10% Raney nickel based on the amount of copolymer was subjected to hydrogenation for 20 hours at 150° C. at 540 to 1600 p. s. i. pressure. The resulting hydrogenated copolymer had a molecular weight of 599 and contained alcoholic hydroxyl groups in such number that the hydroxyl value was 0.28 equivalent per 100 grams.

*Example VII*

The copolymerization may also be effected with heat in the absence of polymerization catalyst. A solution of 68 parts of 2-phenylpropene and 32 parts of acrolein was heated under a nitrogen atmosphere in a stainless steel vessel for 5 hours at 110° C. under an autogenous pressure of about 20 p. s. i. The refractive index ($n$ 20/D) of the solution increased from 1.4940 to 1.5351 during this period. The reaction mixture was then subjected to distillation under reduced pressure whereby there was recovered 43 parts of a solid resin which was soluble in benzene, had a carbonyl value of 0.519 equivalent per 100 grams and a molecular weight of 1033.

*Example VIII*

Thirteen parts of acrolein was added to a refluxing solution of 85 parts of 2-phenylpropene and 2 parts of di-tertiary-butyl peroxide over a period of 7 hours and the heating of the mixture was then continued for an additional 5½ hours. Reduced pressure distillation was used to remove unreacted materials. The residue consisted of 42 parts of solid copolymer having a carbonyl value of 0.434 equivalent per 100 grams and a softening point of 121° C. (Durrans).

A polymercaptal was prepared from the copolymer. A solution of 25 parts of copolymer dissolved in 100 parts of dioxane was mixed with 17 parts of ethyl mercaptan. Hydrogen chloride gas was bubbled into the solution as the mercaptal-forming catalyst, and the treated solution was allowed to stand at room temperature of about 20-25° C. for two weeks. Then the hydrogen chloride and unreacted material was removed by distillation in vacuo to give the solid polymercaptal resin which was found to have a sulfur content of 14.9%.

*Example IX*

A solution of 69 parts of 2-phenylpropene, 30 parts of acrolein and 1 part of di-tertiary-butyl peroxide was heated at reflux temperature for 24 hours. Removal of the unreacted materials by reduced pressure distillation gave 21 parts of solid copolymer resin having a carbonyl value of 0.55 equivalent per 100 grams and a molecular weight of 765.

Five parts of the resulting copolymer was dissolved in a mixture of 15 parts of ethanol and 15 parts of pyridine, and then reacted with 6 parts of paraformaldehyde in the presence of 0.5 part of sodium hydroxide. The reaction was carried out with stirring at 70-85° C. for 2 hours. The formed resin was precipitated from the reaction solution by pouring the solution into water and filtering the resin therefrom. The dried resin was a solid having a hydroxyl value of 0.23 equivalent per 100 grams and a carbonyl value of 0.27 equivalent per 100 grams.

When another 5 parts of the copolymer dissolved in 20 parts of dioxane had ammonia gas bubbled into the solution, the solution gelled in a few minutes. After evaporation of the solvent, there was obtained a solid resin having a nitrogen content of 0.65%.

A warm (60° C.) solution of 5 parts of the original copolymer dissolved in 15 parts of pyridine was mixed with a solution of about 1 part of hydroxylamine hydrochloride dissolved in 20 parts of methanol. The polyaldoxime formed and was recovered from the reaction solution by pouring the solution into water. The dried solid resin had a hydroxyl value of 0.447 equivalent per 100 grams, a carbonyl value of 0.10 equivalent per 100 grams, and a nitrogen content of 6.3%.

*Example X*

Copolymer was prepared by refluxing a mixture of 80 parts of 2-phenylpropene, 18 parts of acrolein, and 2 parts of di-tertiary-butyl peroxide for 22 hours. Removal of unreacted materials by vacuum distillation gave a 47% yield of solid copolymer having a carbonyl value of 0.47 equivalent per 100 grams.

To a solution of 3 parts of the copolymer dissolved in about 100 parts of dioxane was added a solution of 0.5 part of sodium hydroxide in 5 parts of water and 10 parts of powdered silver oxide. The mixture was stirred and warmed to about 70° C., and then allowed to stand for about 18 hours. The excess silver oxide was next removed by filtration and the filtrate was acidified with hydrochloric acid. The resulting polycarboxylic acid resin was isolated by precipitation in water, and then washed with water and dried. The solid resin had a carboxylic acid value of 0.26 equivalent per 100 grams.

We claim as our invention:

1. A process for the production of a resinous copolymer which comprises copolymerizing acrolein with 2-phenylpropene by heating at about 50° C. to 200° C. in the presence of a peroxy polymerization catalyst a liquid mixture of the two reactants having present therein a mol ratio of the hydrocarbon to the aldehyde of about 50:50 to 98:2.

2. A process for the production of a resinous copolymer which comprises copolymerizing acrolein with 2-phenylpropene by heating at about 80° C. to 150° C. in the presence of di-tertiary-butyl peroxide a liquid mixture of the two reactants having present therein a mol ratio of the hydrocarbon to the aldehyde of about 50:50 to 98:2.

3. A process for the production of a resinous copolymer which comprises heating and copolymerizing a liquid mixture of acrolein and 2-phenylpropene at about 80° C. to 150° C. in the presence of a peroxy polymerization catalyst, said mixture containing a mol ratio of the hydrocarbon to the aldehyde of about 50:50 to 98:2.

4. A resinous copolymer of acrolein and 2-phenylpropene, said resinous copolymer containing about 5 to 60 mol percent of units of the aldehyde in the polymer molecules thereof with a plurality of the aldehyde groups remaining intact in the polymer molecule.

5. A process for the production of a resinous polyhydric alcohol which comprises copolymerizing acrolein with 2-phenylpropene by heating at about 50° C. to 200° C. in the presence of a peroxy polymerization catalyst the two reactants as a liquid mixture containing a mol ratio of the hydrocarbon to the aldehyde of about 50:50 to 98:2, then separating the formed resinous copolymer from unpolymerized material, and subsequently subjecting the copolymer in a solvent to catalytic hydrogenation at about 80° C. to 250° C. under a pressure of at least 200 pounds per square inch until a majority of the aldehyde groups have been reduced to alcoholic hydroxyl groups.

6. A process for the production of a resinous polyhydric alcohol which comprises heating and copolymerizing a liquid mixture of acrolein and 2-phenylpropene at about 80° C. to 150° C. in the presence of a peroxy polymerization catalyst, said mixture contining a mol ratio of the hydrocarbon to the aldehyde of about 50:50 to 98:2, next separating the formed resinous copolymer from unpolymerized material, and then subjecting the aldehyde copolymer to hydrogenation in a solution and in the presence of a hydrogenation catalyst at about 80° C. to 250° C. under a pressure of at least 200 pounds per square inch until the aldehyde groups of the copolymer have been substantially reduced to alcoholic hydroxyl groups.

References Cited in the file of this patent

UNITED STATES PATENTS

| | | |
|---|---|---|
| 2,256,152 | Nutting et al. | Sept. 16, 1941 |
| 2,326,736 | Adelson et al. | Aug. 17, 1943 |
| 2,478,154 | Evans | Aug. 2, 1949 |
| 2,554,973 | Ballard et al. | Mar. 29, 1951 |
| 2,555,775 | Adelson et al. | June 5, 1951 |
| 2,564,632 | Wicklatz | Aug. 14, 1951 |
| 2,651,624 | Swart | Sept. 8, 1953 |
| 2,657,192 | Miller et al. | Oct. 27, 1953 |

OTHER REFERENCES

Smith et al.: Amer. Chem. Soc., vol. 73, November 1951, pp. 5273–5280.